(12) United States Patent
Watson

(10) Patent No.: US 6,748,327 B1
(45) Date of Patent: Jun. 8, 2004

(54) METHOD FOR SPATIAL ESTIMATION OF SOLAR RADIATION FLUX DENSITY AND OTHER SOLAR CORRELATED METEOROLOGICAL VARIABLES

(76) Inventor: Larry Watson, P.O. Box 61, Saratoga, CA (US) 95071

( * ) Notice: Subject to any disclaimer, the term of this patent is extended or adjusted under 35 U.S.C. 154(b) by 0 days.

(21) Appl. No.: 10/261,918

(22) Filed: Oct. 1, 2002

Related U.S. Application Data

(60) Provisional application No. 60/328,650, filed on Oct. 11, 2001.

(51) Int. Cl.⁷ .............................................. G06F 169/00
(52) U.S. Cl. .......................................................... 702/3
(58) Field of Search ........................ 702/2, 3, 4; 324/26

(56) References Cited

U.S. PATENT DOCUMENTS 6,424,917 B1 * 7/2002 Kalkstein et al. .............. 702/3

OTHER PUBLICATIONS

Assessing Integrity of Weather Data for Reference Evapotranspiration Estimation By: Richard G. Allen, Member, ASCE Journal of Irrigation and Drainage Engineering/Mar./Apr. 1996 pp. 97–106.

* cited by examiner

*Primary Examiner*—Donald McElheny, Jr.
(74) *Attorney, Agent, or Firm*—Thomas R. Lampe

(57) ABSTRACT

A multivariable statistical method for estimating solar correlated variables for a geographical location identified by latitude and longitude within a geographical region including a synchronous network of a plurality of weather stations incorporating instruments necessary to acquire or calculate the variables and a database of daily historical meteorological values of the variables for specific time periods over a number of years.

10 Claims, 19 Drawing Sheets

FIG. 7a $$v = \bar{v} + v'$$

where $v =$ sample value for sample period
$\bar{v} =$ mean value of all samples
$v' =$ departure from the mean value for this sample

FIG. 7b $$R_S = \overline{R_S} + R'_S$$

$$= \overline{R_S}\left(1 + \frac{R'_S}{\overline{R_S}}\right)$$

$$= \overline{R_S}\left(1 + \frac{R_a k'}{R_a \bar{k}}\right)$$

$$= \overline{R_S}\left(1 + \frac{k'}{\bar{k}}\right)$$

$$= \overline{R_S}\left(1 + k'_{norm}\right)$$

or alternatively $$= \overline{R_S} + \overline{R_S} * k'_{norm}$$

$$\rho = \frac{C}{\sigma 2}$$

$$\sigma 2 = \gamma + C$$

METHOD FOR SPATIAL ESTIMATION OF SOLAR RADIATION FLUX DENSITY AND OTHER SOLAR CORRELATED METEOROLOGICAL VARIABLES

This application is based on and claims the benefit of U.S. Provisional Patent No. 60/328,650 filed on Oct. 11, 2001.

BACKGROUND OF THE INVENTION

1. Field of the Invention

The present invention relates to a method for estimating solar radiation flux density and other solar-correlated meteorological variables at a location, based on measurements of the same variables at other locations within the same geographic region for the same period of time. The description of the method is based on hourly measures of the variables but could be used with measurements representing lesser or greater length daytime periods. The method is similarly described using measurements taken 2 meters above the earth's surface but could be applied to measurements from other distances above the surface. Modeling or extrapolating variables to locations within the region, for which measurements are not available, is typically done using traditional statistical methods such as least squares regression of linear equations of a chosen order, or by employing the techniques of geostatistics, common to hydrology and geology. The later methods are characterized by providing preferential significance to measurements near the location to be estimated. Application of geostatistics to biometeorological applications has been limited due to poor correlations using common geophysical coordinate systems. The method of this invention improves the application of geostatistical techniques to biometeorological estimations through the application of three steps: (1) decomposition of any measurement into two components, the mean measurement from historical observations for the same period of the year and the normalized departure from the mean for the measurement, (2) decomposition of the measured solar radiation flux density into the product of the calculated extraterrestrial radiation at each location and the clearness index, (3) and, transformation of the coordinate system for measured and estimated mean value locations from (x,y,z), typically latitude, longitude, and elevation or depth, to a computed coordinate system (x',y',z') based on the relative calculated extraterrestrial radiation within the region, and one or two additional regionally-specific axes for analysis and modeling of mean values. For a specific (x,y) location, the extraterrestrial radiation flux density is the same each year, on the same day-of-the-year and hour-of-the-day, i.e. a constant that can be calculated.

The value of this method would, at least, provide important information for the engineering of solar photovoltaic applications, agricultural and landscape irrigation management, regional water use allocations, and, passive space conditioning. A person knowledgeable in the fields of geostatistics and biometeorology should be able to implement this method and achieve results superior to other methods of spatial estimation of solar radiation flux density and other solar-correlated meteorological variables.

2. Description of the Prior Art

The method is illustrated for an example region using the synoptic observations made available by the California Irrigation Management Information System (hereafter CIMIS). This network of more than 180 stations depicted in FIG. 1 of this application are scattered throughout the state and the associated database of measurements have been maintained and quality assured since 1982 by the State of California, Department of Water Resources. Each dot on the map of California county boundaries identified in FIG. 1 represents the location of one CIMIS weather station. Details of the network, station locations, and the instruments at each station are described in *Technical Elements of CIMIS, The California Irrigation Management Information System* published December, 1998 by State of California, The Resources Agency, Department of Water Resources, Division of Planning and Local Assistance. Although the method is demonstrated for this network within the region identified as California, it could be applied to any region supporting a similar synoptic network of meteorological instruments and a database of historical observations. Similarly but not demonstrated, measurements need not be surface-based. Remotely sensed measurements, such as satellite-based images shown in FIG. 8, could be used in the application of this method. Spatial estimation of a variable is commonly done at grid intersection points on a uniform grid created to cover the entire region. From a high-density grid description, utility software can create a contour map of variable value ranges throughout the region, as in FIG. 2. FIG. 2 was created from a data file representing measurements of solar radiation flux density in Watts per square meter on a flat surface at 2 meters for Nov. 10, 1996 from 12 pm to 1 pm Pacific Standard Time. The traditional technique used was linear regression of a cubic equation to the dataset. The range of measurements varied from 89 to 725 Watts per square meter but this traditional method estimated negative values of solar radiation for some parts of the region. For sizing of photovoltaic applications, yearly average solar radiation flux density for every daylight hour of the year would be required. FIG. 3 represents the same traditional technique used in FIG. 1, but applied to the average solar radiation flux density for November 10, 12 pm to 1 pm Pacific Standard Time for all years of record. The appearance of significant areas represented by negative solar radiation would question the application of the technique. A more sophisticated technique would be to consider applying an equation of a higher order or geostatistical techniques to the problem.

Geostatistical analysis is the collection of statistical and other numerical techniques for determining spatial correlations between measured variables within a region, developing models that represent those spatial correlations, and then using those models to estimate variables at other locations within the region. Geostatistics has been widely used in many fields to estimate variables at locations lacking measurement, but most commonly in hydrology and geology.

The first step in a geostatistical analysis would be an attempt to identify spatial correlation structures in the data between pairs of measurements with similar vector separations. Prior to the analysis of correlation however, the number of pairs of samples available for all possible similar separations must be computed and analyzed. FIG. 4 indicates the number of pairs at various intervals of separation available in the database of observations for geostatistical analysis within the region. For a measure of correlation to be calculated for samples with a similar separation, there must be a sufficient number of pairs of samples. Note the value of 549 in the center of the map (FIG. 4). This indicates that there are 549 sample pairs separated by less than ½ degree from approximately 150 stations in 18 years of samples for this hour-of-the-year. Consider as an example pair of stations, San Jose located at (−121.95, 37.326) and Sacramento located at (−121.218, 39.65). The vector separation from San Jose to Sacramento would be (0.732, 2.324) which would fall within the interval (1,2). In FIG. 4 at that grid intersection, there are 65 sample pairs with a similar separation. Note also that at (−1,−2) there are also 65 samples. This sample pair would also be included in those 65 pairs and represents the vector drawn from Sacramento to San Jose, which is equal in magnitude but in the opposite direction of the San Jose to Sacramento vector. Geostatistics accommodates this double counting of sample pairs. As indicated in FIG. 4, it is very important to note that there are only an adequate number of samples for some separations only out to about 3.5 degrees. Hence, further analysis of spatial correlations for these measurements will be limited to separations of 3.5 degrees or less for any direction. Alternatively, this would represent approximately 35% of the maximum separations possible within the region.

The correlation between sample pairs for all possible spacings within the region can be calculated and then reported as a correlogram map as shown in FIG. 5. Computation of the correlogram for all pairs produces the correlogram map (FIG. 5) based on the same average measured values used to create FIG. 3. For those separations with the highest correlation (approximately 0.7), their value would be disregarded due to the fact that they represent only 2 samples as indicated in FIG. 4 at the same coordinates. In the application of geostatistics, it is generally desirable for closely spaced samples to exhibit high correlations and it is expected that correlations would decrease as separations are increased. Analysis of this correlogram map indicates little justification for employing geostatistical techniques.

Pertinent prior art publications in this field are as follows:
1. Allen, R. G., "Assessing Integrity of Weather Data for Reference Evapotranspiration Estimation", *Journal of Irrigation and Drainage Engineering*, March/April 1996.
2. U.S. Pat. No. 6,343,255, issued Jan. 29, 2002.
3. U.S. Pat. No. 6,345,108, issued Feb. 5, 2002.

The method disclosed and claimed herein is not taught or suggested by the indicated prior art.

3. Definition of Terms Used in this Invention

Clearness Index: A variable used to normalize solar radiation flux density $R_s$ obtained by dividing the mean measured solar radiation $R_s$ by the calculated extraterrestrial radiation flux density $R_a$. The value of this variable would be expected to be in the range of near zero to less than one. Low values near midday would be due to solar eclipses, extreme dust, heavy smoke, clouds, or rain. However, due to reflection from nearby cumulus clouds, short-interval values slightly exceeding a value of one have been observed.

Example Region: The region chosen as an example is the state of California, USA. The methods reported here might be applied to any greater or lesser region for which a similar network of observations is available. California is a good example for two reasons: the North-to-South extent of the region is significant, and the region represents the boundary between the Pacific Ocean and the continent at latitudes characterized by a mean easterly onshore flow.

Extraterrestrial Radiation Flux Density ($R_a$): The theoretical solar radiation that would be measured at the top of the atmosphere on a flat surface parallel to the earth surface and along a line from a point on the surface of the earth to the center of the sun. The value could be either the instantaneous flux density or the average for a period such as an hour.

At the earth surface, the solar radiation flux density ($R_s$) measured by a pyranometer at the same instant would be expected to be less than ($R_a$) due to atmospheric scattering, reflection, and absorption. However due to reflection from nearby cumulus clouds during generally clear conditions, $R_s$ might exceed $R_a$ for short periods. The average value of extraterrestrial solar radiation flux density $R_a$ for a time interval can be calculated given the location, the day of the year, and, the beginning time and length of the period. Location is usually specified in degrees of latitude North (South is negative) and degrees of longitude East (West is negative).

Geostatistics: A collection of statistical techniques used since the 1950's for estimation of variables at locations between or beyond measured samples. These techniques are commonly used in geophysical sciences and resource engineering. The methods are applied to a "field", and, in this example, the field is the surface of the earth within the state boundaries of California. The fundamental process is to identify and then exploit spatial correlations that are greatest for nearby samples, but then decrease with increased distance between sample locations. These techniques can be used in fields with two or more dimensions, although this example is in 2 dimensions, it could be easily extended to three. Preparing estimates at any location affords greater weight (importance) to samples nearer the estimate location. The distances for improved correlation can be onmi directional (any direction) or directional (preferred directions). Geostatistical methods are commonly used in hydrological models, mining or other resource extraction planning, or pollution management. Although geostatistical methods have been explored in many fields, the method described herein is the first to develop models for solar radiation flux density and correlated variables by using a three-step process: (1) decompose measured variables into mean and departure, (2) decompose solar radiation flux density into the product of extraterrestrial radiation and clearness index, (3) model spatial correlation of mean variable measurements in a transformed coordinate system, (4) model departures of mean values, and then (5) combine mean and departure models.

Hour-of-the-year. The method is employed at the maximum resolution of the example data: hourly averages. At any station location, for a specific day-of-the-year and hour-of-the-day, the extraterrestrial radiation is the same, or constant, every year. Variation in solar radiation flux density at the earth's surface between yearly samples is only a function of the clearness index for that hour.

Other Solar Correlated Meteorological Variables: Directly intercepted radiation from the sun is the primary energy source for light, warmth, evaporation of liquids, and photochemical reactions (such as photosynthesis) at the earth's surface. Analysis of historical data revealed significant correlation between solar radiation flux density and other variables: reference evapotranspiration, temperature, and atmospheric moisture parameters.

Reference Evapotranspiration: The United Nations Food and Agriculture Organization (FAO) provides an internationally accepted method for approximating the upward water vapor flux from a carefully defined reference surface of grass. In agricultural production, evapotranspiration represents the water that must be replenished either through precipitation or irrigation. Carefully calculated reference evapotranspiration is multiplied by crop-specific coefficients to estimate the evaporation from surfaces supporting vegetation other than the reference grass surface, such as avocados or alfafa. This permits input to management decisions regarding allocation of water resources among agriculture, wildlife, and other uses.

Solar Radiation Flux Density ($R_s$): Solar radiation within the visible spectrum falling on a flat surface can be measured by a solar pyranometer such as a LICOR 2000SA used at each CIMIS weather station. The most common units are Watts per square meter. The instruments are calibrated to report the effective radiation flux density normal (perpendicular) to the surface in Watts per square meter averaged for a one hour period. This represents the solar energy available for conversion to useable electricity by photovoltaic materials, for evaporation of water, for the support of photosynthesis by plants, or to controllably increase the internal energy (heat) of a surface or volume.

Synoptic instrument network: The example network used data loggers to repeatedly sample the instrument measurements and then report an average value for a one-hour period defined by an ending time in Pacific Standard Time to a central database. Although the example is for a one-hour period, the method could be applied to other time intervals representing a portion of any daytime period of one hour or less. Application of the method to periods of greater length could be accomplished by summing the results of the aforementioned periods.

Vapor pressure deficit(vpd): A moisture variable commonly used in biometeorology to indicate the "dryness" of the air. When combined with the mean wind speed, it represents the contribution of evapotranspiration due to hot dry winds. Relative humidity is the moisture variable actually measured at the sample locations but any moisture variable can be calculated from relative humidity, temperature, and barometric pressure. Other moisture variables might be dew point temperature, wet bulb temperature, mixing ratio, etc. The barometric pressure of the air is equal to the sum partial pressures of the gases it contains, one of which is water vapor. Water vapor pressure deficit is the difference between the water vapor pressure of a sample of air subtracted from what the water vapor pressure would be if the air were saturated at the same temperature.

BRIEF SUMMARY OF THE INVENTION

This invention is a multivariable statistical method that can be expressed as an algorithm to estimate solar radiation flux density or any solar-correlated variable for any location within a region that includes a synchronous network of weather stations and a database of historical hourly average values of all meteorological variables. Computing estimates for all grid points on a uniform grid covering the region permits contours such as FIG. 19 to be calculated. FIG. 6 is block diagram outlining the method. The solar radiation flux density, $R_s$, will be used when an example is beneficial. The solar-correlated variables available in this network include air temperature, water vapor pressure, reference evapotranspiration, and wind speed, all provided as hourly averages. The method comprises:

1. Compute data quality and statistics, including mean, maximum, minimum, and variance of all measured variable samples at all locations for this hour-of-the-year over all years available.
2. Analyze spatial correlations all over data history and develop variogram models for both mean and normalized departure variables. Mean variables require a transformation to an alternative coordinate system prior to model development. Measured solar radiation flux density will be normalized to the clearness index.
3. Create a uniform grid mesh over region and estimate the mean and normalized departure variables at all grid intersections utilizing the variogram models developed.
4. Transform mean variable grids back to latitude and longitude.
5. Combine the estimate for the mean and the estimate for the departure from mean at every grid intersection.
6. Draw contours on a map of the region indicating values of the variable over the entire region as shown in FIG. 19.

BRIEF DESCRIPTION OF THE SEVERAL VIEWS OF THE DRAWING

FIG. 7a is an equation expressing the decomposition of an observed sample measurement into the mean value for the sample hour-of-the-year and the departure of this sample from the mean value of all samples available for this hour-of-the-year.

FIG. 7b is an equation that represents the decomposition of a solar radiation flux density measurement into the sum of the mean value observed for this hour-of-the-year and the departure of this sample from the mean value for this hour-of-the-year. Further indicated is the decomposition of the solar radiation flux density into the product of the extraterrestrial solar radiation flux density and the clearness index either as the mean value of clearness for this hour-of-the-year or the departure from normal clearness.

FIG. 12 is the formula showing the relationship between the four statistical measures representing correlation or lack of, used in geostatistics: variance ($\theta^2$), covariance (C), correlogram ($\rho$), and semivariogram ($\gamma$).

DETAILED DESCRIPTION OF THE INVENTION

Figure 6:
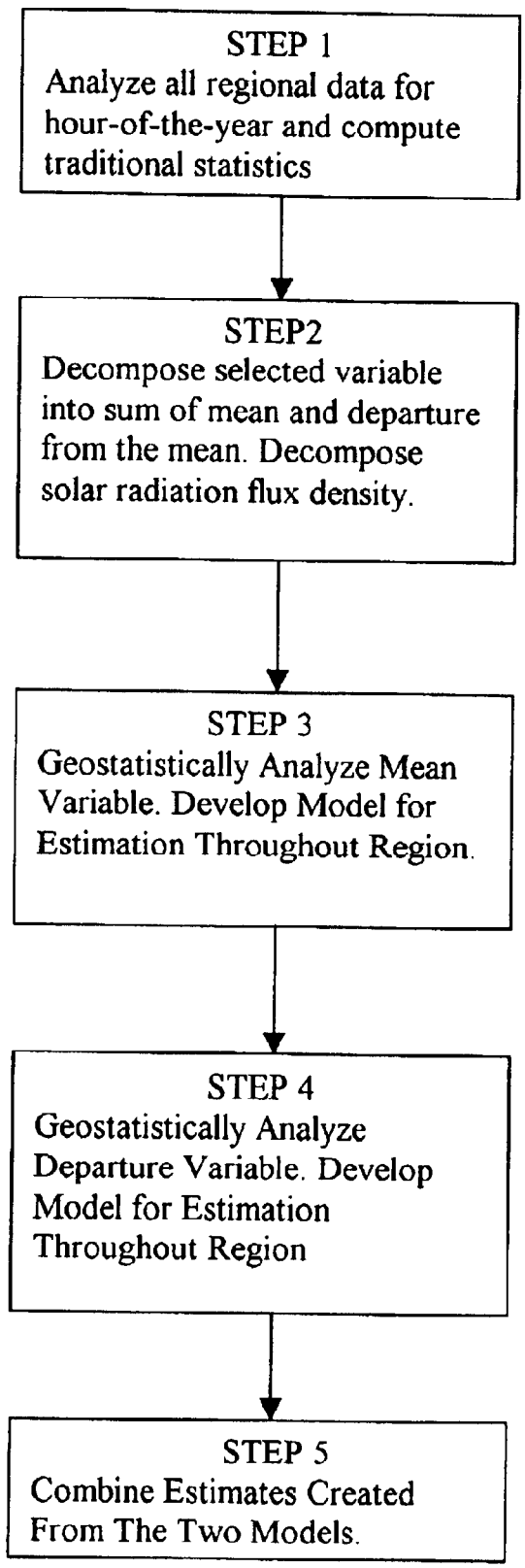
FIG. 6 is a block diagram of the steps in the method of this invention.

The method of the invention is applied to the data associated with a meteorological database representing all recorded and validated observations from weather stations irregularly distributed throughout a region over many years. The resolution of the data is one-hour time intervals. It mainly comprises 5 successive stages. The outline of the method is indicated in FIG. 6.

I-1 Statistical Analysis of Database

Perform statistical analysis and validation of required measured variables for the dataset that includes the entire period of record for a specified hour-of-the-year. The example database of the CIMIS network was established in 1982, and hence some stations have up to 21 years of historical hourly data. Filter to remove any observations of questionable quality and compute statistics, including mean, maximum, minimum, and variance of all measured variable observations at all locations for this hour-of-the-year over all years available. In calculating mean variable, a minimum number of observations is required to provide sufficient basis to such a measure. In this analysis 5 samples were selected as the threshold but for a longer period of record, a higher threshold would be desirable.

During statistical processing the measured solar radiation flux density, $R_s$, is decomposed into the product of the extraterrestrial solar radiation flux density, $R_a$, and the clearness index, $k_t$, $R_a$ can be calculated for any location given latitude, longitude, day-of-the-year, and hour-of-the-day. A C-language function is included in this specification for disclosure of such an algorithm. For any location, this algorithm corrects extraterrestrial solar radiation flux density for the difference between local solar time and Standard Time, used to define the database time interval boundaries. Since both the sun and the earth move during the one-hour period, this algorithm computes the average value at the period midpoint.

I-2 Decomposition of Variables

Subsequent to stage I-1, all historical data for this hour-of-the-year is reprocessed, the meteorological variables for analysis and modeling are decomposed into the mean value and departure from the mean (FIG. 7a). Departures from the mean are normalized by dividing the departure by the mean as shown in FIG. 7b.

I-3. Geostatistical Analysis and Variogram Model Development for Mean Variables.

Figure 5:
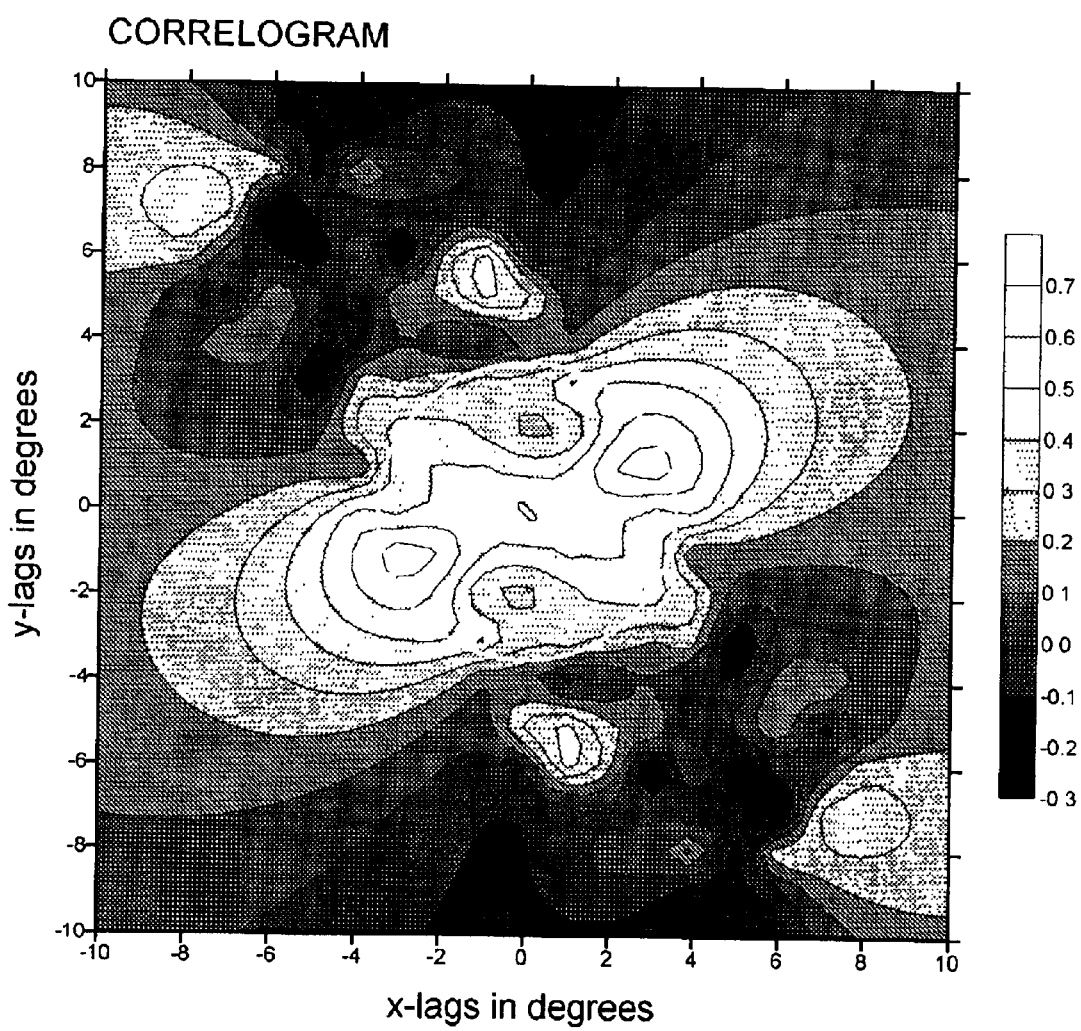
FIG. 5 is a correlogram map computed for the pairs of mean solar radiation flux density indicated in FIG. 4. The light circle with a radius of 3.5 degrees indicates the range of separations with acceptable numbers of pairs for analysis. The coordinate system represents all separations possible within the range without regard to the number of samples available in the database for this hour-of-the-year at any separation distance.

Analysis of spatial correlation is prerequisite to building variogram models of spatial correlation necessary for estimation. Analysis of correlation is done utilizing groups of data sample pairs separated by similar distances. The dataset used in the analysis would include the mean variable value for every weather station location of record developed from the first two stages. Analysis of correlation for the mean dataset in a coordinate system based on pair separations in degrees indicated little significance in prior art, FIG. 5. A key principle of this method is to improve the correlation with distance for mean values by transforming the latitude and longitude coordinate system into an improved coordinate system in which to perform the geostatistical analysis. This method performs a similar analysis subsequent to transformation of coordinate systems. For this region, the result of this transformation for the grid intersections on an arbitrary 15×15 grid over the region is indicated in FIG. 9.

Figure 9:
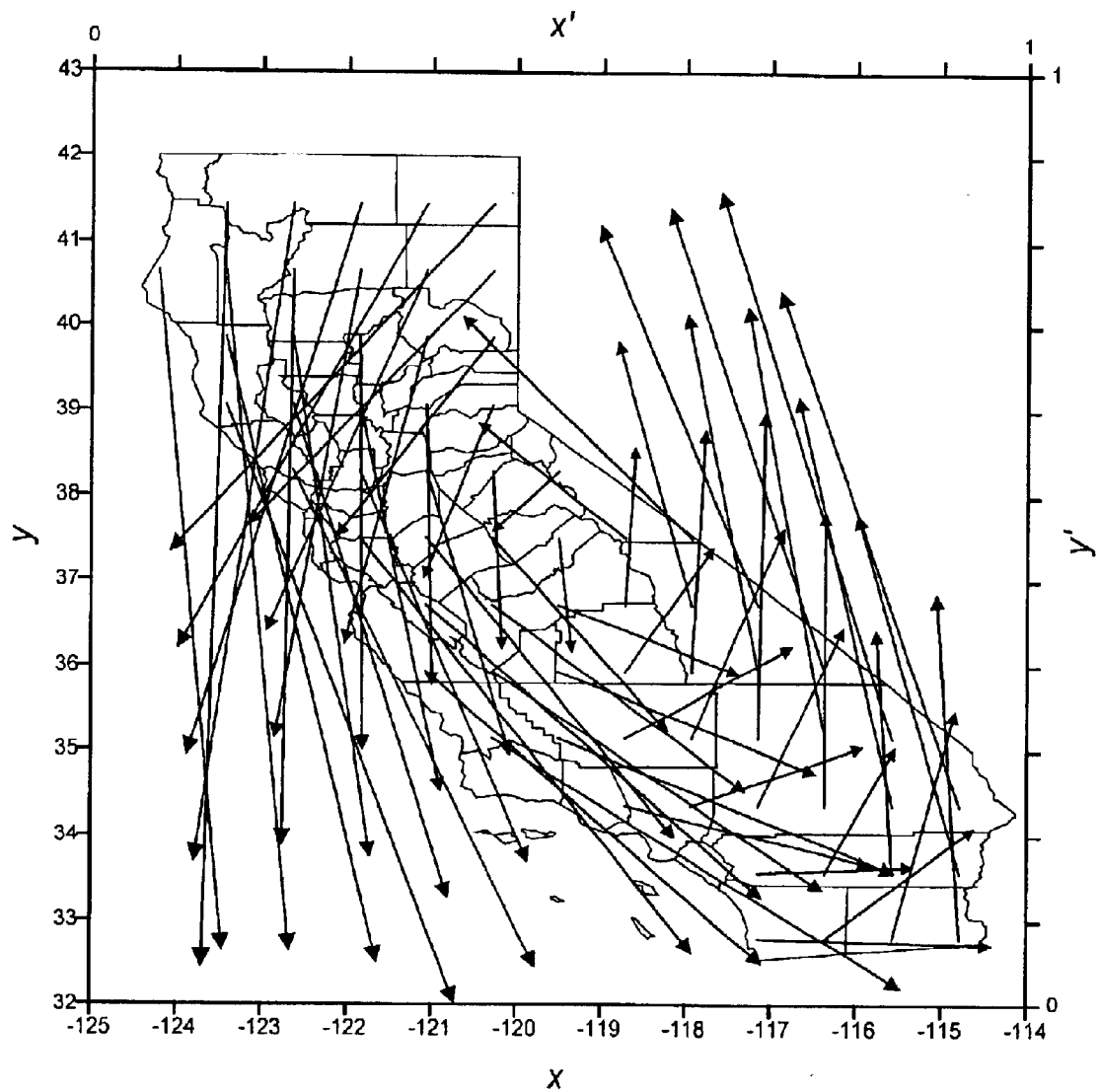
FIG. 9 is a vector map indicating transformation of a location within the region expressed in longitude East and latitude North to a hour-of-the year specific coordinate system unique to this method for November 10 of any year from 12pm to 1pm Pacific Standard Time.

In FIG. 9 the ordinate axis has double scales labeled x and x', and the abscissa axis has double scales labeled y and y'. The coordinate system (x,y) is the traditional easting, northing pair in longitude East and latitude N. The counties of California are displayed using this scale. Given a specific location (x,y) for a given hour-of-the-year, coordinates in (x',y') can be computed as detailed in the following. The vector arrows originate at a location in the (x,y) scales and end at the location of the same point in the transformed scale.

The x' value represents the relative extraterrestrial solar radiation flux density as a fraction of the range possible within the region normalized to a value between 0 and 1. For a given hour-of-the-year, the extraterrestrial radiation at any location can be calculated and thus the range of possible values within the region can be established. This is the primary variable for any region: the "maximum possible" solar radiation flux density available to penetrate the atmosphere and reach the surface for a location. As the first independent variable, it will be the x-axis variable in this example region. The range of extraterrestrial solar radiation flux density possible is determined by calculating the extraterrestrial solar radiation flux density circumscribing at intervals around the perimeter of the region. The extraterrestrial solar radiation flux density for the specific location is divided by the difference between the maximum calculated value and the minimum calculated value to produce an x'-axis coordinate. This would be the primary coordinate in applying this method to any region, unlike the $2^{nd}$ (and $3^{rd}$, if used) coordinate axes. The calculations would be done using the Ra C-language function included below:

```
/***************************************************************
****************
                    Ra - extraterrestrial radiation
****************************************************************
****************/
double Ra { int   J,           /* julian day of year         */
            double t,          /* time of period midpoint    */
            double del__t,     /* length of period           */
            double latitude,   /* of site, degrees           */
            double logitude,   /* of site, degrees           */
            char   timezone    /* PST,MST,CST,EST            */
          }
{
    double phi ;     /* latitude in radians */
    double del,Lz,Lm,b,Sc,omega,omega1,omega2,dr,factor,resultant ;
    phi = latitude * { PI / 180.0 };
    del = 0.409 * sin ( 2.0 * PI * {double} J /365.0 – 1.39) ;
    Lm = logitude ;
    switch (timezone)
      {
        case 'P':       Lz = 120.0 ; break ;
        case 'M':       Lz = 105.0 ; break ;
        case 'C':       Lz = 90.0 ; break ;
        case 'E':       Lz = 75.0 ; break ;
        default:        return { Gsc + 1.0 } ;
      }
    b = 2.0 * PI * ( {double} J – 81.0 ) / 364.0 ;
    Sc = 0.1645 * sin (2.0 * b) – 0.1255 * cos (b) – 0.025 * sin (b) ;
    omega = PI / 12.0 * ( ( t + 0.066667 * ( Lz – Lm ) + Sc ) – 12.0 ) ;
    omega1 = omega – ( PI * del__t / 24.0 ) ;
    omega2 = omega + ( PI * del__t / 24.0 ) ;
    factor = ( omega2 – omega1 ) * sin (phi) * sin (del) +
             cos (phi) * cos (del) * ( sin (omega2) – sin (omega1) ) ;
    dr = 1.0 + 0.033 * cos ( 2.0 * PI * J / 365.0 ) ;
    resultant = 12.0 / ( del__t * PI ) * Gsc * dr * factor ;
    if ( resultant > 0.0 ) return ( resultant) ;
    return ( 0.0 ) ;
}
```

The y'-value for this region was determined to be the relative zonal distance to the coast for a location. This, in effect, makes the coast of California the y-axis (x=0) with values normalized between 0 and 1, thereby representing all distances possible within the region. Minimum and maximum distances were determined for the region. A C-language algorithm named Coast is included below to compute the zonal (westward) distance to the coast. The function has an array of coordinates that defines the coast of California and linearly extrapolates coastal coordinate at latitude of location input. The algorithm corrects for distance errors due to the convergence of longitude with increasing latitude due to the curvature of the earth. To make the value in the range of 0 to 1, the value for a location is divided by the difference between the minimum distance to the coast and the maximum distance possible within the region. This transformed coordinate is specific to this region and dataset. The code of the Coast algorithm and the array of coastal locations is as follows:

```
/***************************************************************
****************
             Coast (easting, northing) return distance from coast
****************************************************************
****************/
double Coast (double easting, double northing)
{
    int i;
    double b,m;
    /*
                + (x1,y1) coastal definition pair N of sample
                 \
                  \
                   \
                    + (xc,yc) coastal point at same latitude
                     \      as sample (xi,yi)
                      \
                       \
                        + (x0,x1) coastal definition
                          pair S of sample
    */
    double meridional__zonal__correction;
    struct coastpairs            /* Coastline definition pairs */
      {     double easting;      /* longitude East for location */
            double northing;     /* latitude North for location */
      } Coastline[50] = –117.154312, 32.536098,
        –117.157799, 32.631348,
        –117.267845, 32.667614, –117.359406,
        33.129471, –117.620407, 33.392059,
        –118.430817, 33.736889, –118.415588,
        33.842438, –118.562485, 34.043407,
        –118.958023, 34.052528, –119.245056,
        34.140717, –119.299545, 34.264133,
        –119.495262, 34.383713, –120.499290,
        34.451691, –120.669724, 34.581741,
        –120.614906, 34.703205, –120.658867,
        34.976826, –120.659218, 35.144085,
        –120.911568, 35.249813, –120.903656,
        35.438286, –121.323830, 35.674099,
        –121.384895, 35.802338, –121.916962,
        36.315277, –122.016411, 36.589779,
        –121.865898, 36.649441, –121.826553,
        36.858253, –122.124390, 36.952797,
        –122.415245, 37.203472, –122.419571,
        37.370511, –122.555428, 37.533554,
        –122.541550, 37.717709, –122.502876,
        37.836357, –123.035904, 38.005806,
        –122.986214, 38.159653, –123.039101,
        38.296417, –123.563522, 38.771439,
        –123.749969, 38.961548, –123.710876,
        39.055027, –123.861183, 39.364025,
        –123.817009, 39.698971, –124.049881,
        40.015160, –124.391586, 40.253872,
        –124.447372, 40.449051, –124.166542,
        40.924549, –124.152847, 41.038330,
        –124.200706, 41.131416, –124.095695,
        41.467991, –124.165611, 41.738483,
```

```
            -124.308472, 41.803459, -124.248787,
            41.934441, -124.244179, 42.007172
        };
    if ( northing < Coastline[0] .northing ||
            northing > Coastline[49] .northing ||
            easting < -125 || easting > -114) {
        return ( -1.0 ); /* coordinates out of range */
    }
            /*  search coastline array for northing range   */
        i = 0 ;
    meridional_zonal_correction =
    cos(northing/(double) 90.0 * PI / 2.0);
    while ( Coastline[i].northing <= northing ) i++;
        if ( i==0) return( {easting - Coastline[i].easting) *
            meridional_zonal_correction );
            /* exact match of lower limit */
        m = ( Coastline[i].northing - Coastline[i-1).northing ) /
          ( Coastline[i].easting - Coastline[i-1].easting ) ;
        b = Coastline[i].northing - Coastline[i].easting * m ;
        return((easting-(northing-b)/m) *meridional_zonal_correction);
    }
}
```

Figure 8:
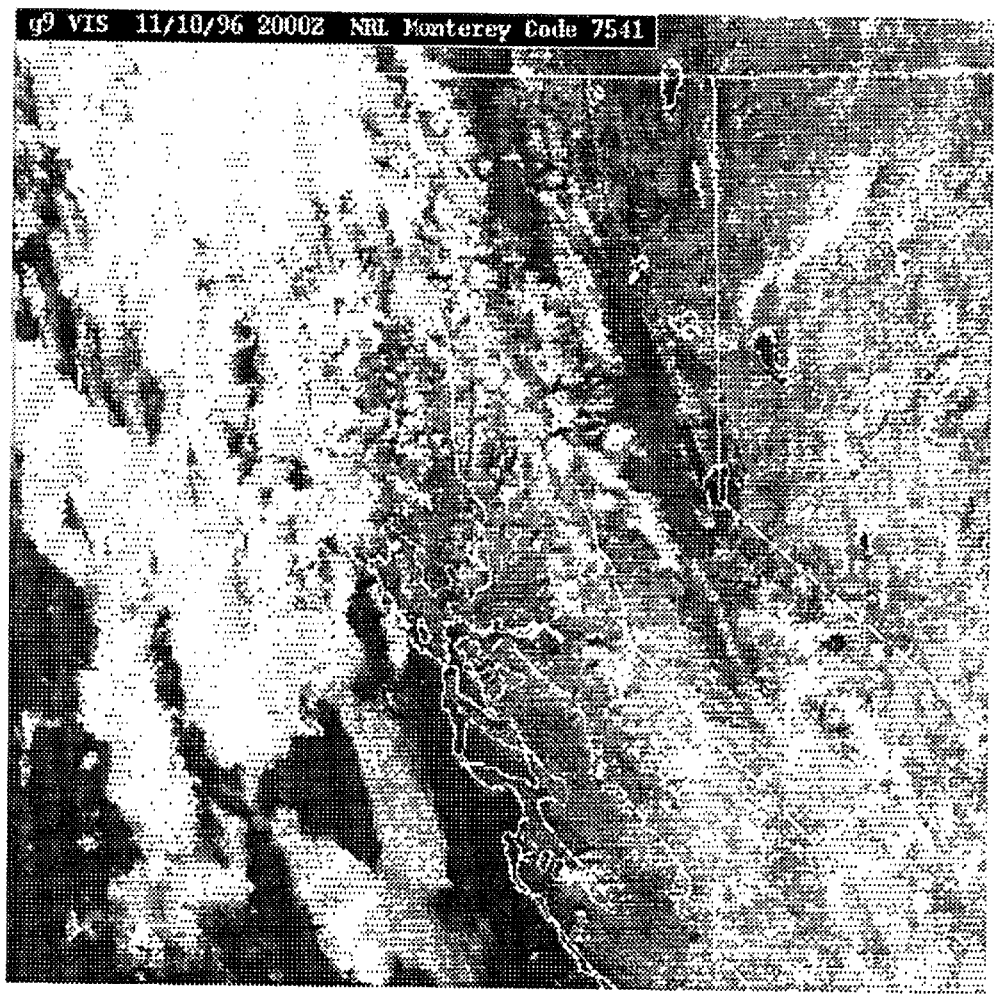
FIG. 8 is a GOES9 visible satellite image for the northern portion of the subject region for 1pm PST on Nov. 10, 1996. Light-shaded pixels in this image of radiation in the visible spectrum indicate clouds, fogs, snow (lower right), California boundary, or 200 meter elevation contours. Lake Tahoe can be identified to the right of image center at the bend in the line defining the California-Nevada border. Monterey Bay below image center indicates clear skies in that area of the state.

Although this method does analysis in only 2 dimensions, 3 dimensions would be preferable, the third being elevation or relative pixel value coincident with the location from a satellite image such as shown in FIG. 8. It was determined that the stations from which the example data was recorded are mostly located in irrigated agricultural valleys. Hence there was not sufficient variation of elevation on the same scale as surface distances to consider elevation as the $3^{rd}$ dimension. The transformed coordinate system might be defined in layman's terms as "maximum possible sunshine" and "distance due west to the beach", normalized 0 to 1 for the range of possible values within the region for this hour-of-the-year.

Figure 4:
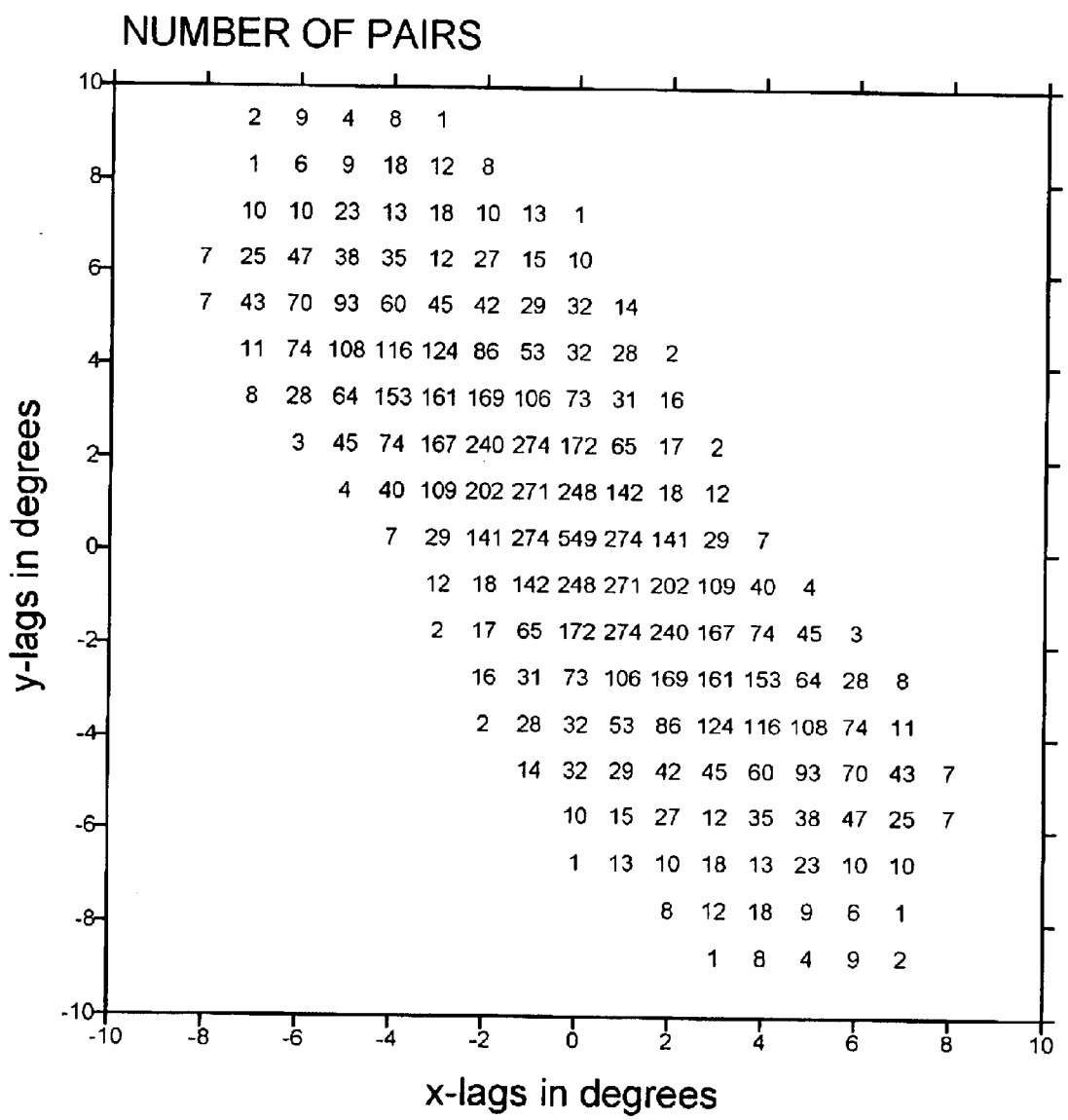
FIG. 4 is a map of the number of measurement pairs of solar radiation flux density available for similar separation in units of 0.5 degrees for an hour-of-the-year. The value of 549 at coordinates (0,0) indicates that 549 pairs of observations are available for locations within 0.5 degrees of each other in any direction. The coordinate system represents all separations possible for the samples available in the database for this hour-of-the-year.
Figure 10:
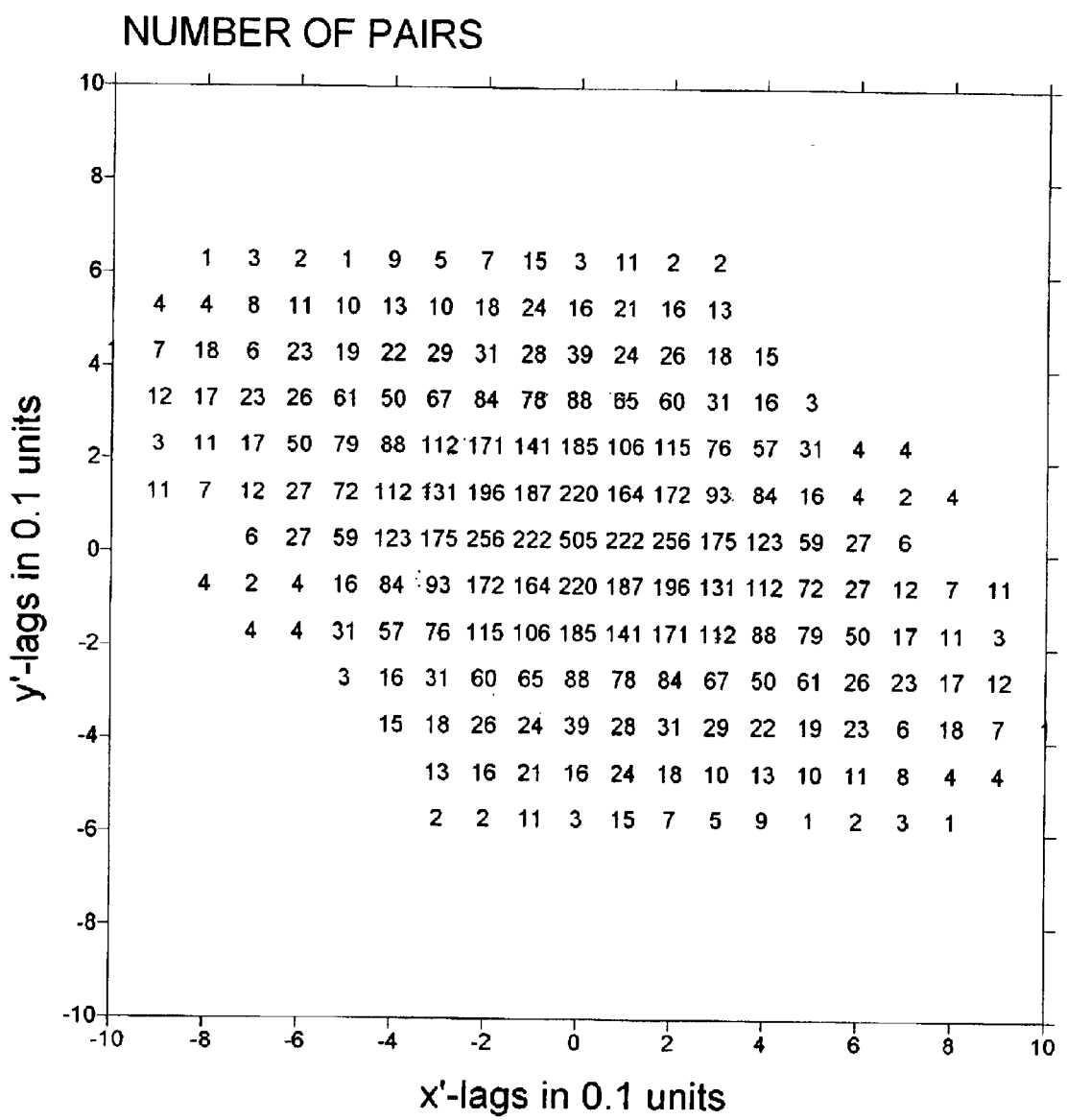
FIG. 10 is a map of the number of measurement pairs of mean solar radiation flux density available for similar separation in units of 0.1 units within the transformed coordinate system for November 10 from 12pm to 1pm Pacific Standard Time. The value of 549 at coordinates (0,0) indicates that 549 pairs of observations are available for locations within 0.5 degrees of each other in any direction. The coordinate system represents all separations possible for the samples available in the database for this hour-of-the-year.

In a manner parallel to the prior art, FIG. 10 shows the number of possible pairs separated by similar distance in the transformed coordinate system. FIG. 10 also indicates a radius of 0.35 units (or approximately 35% of the field extent). When compared to FIG. 4, FIG. 10 represents greater coverage of the region and more sample pairs within the area of significance. Increased numbers of samples generally improves the confidence of statistical measures for description and variability.

Figure 11:
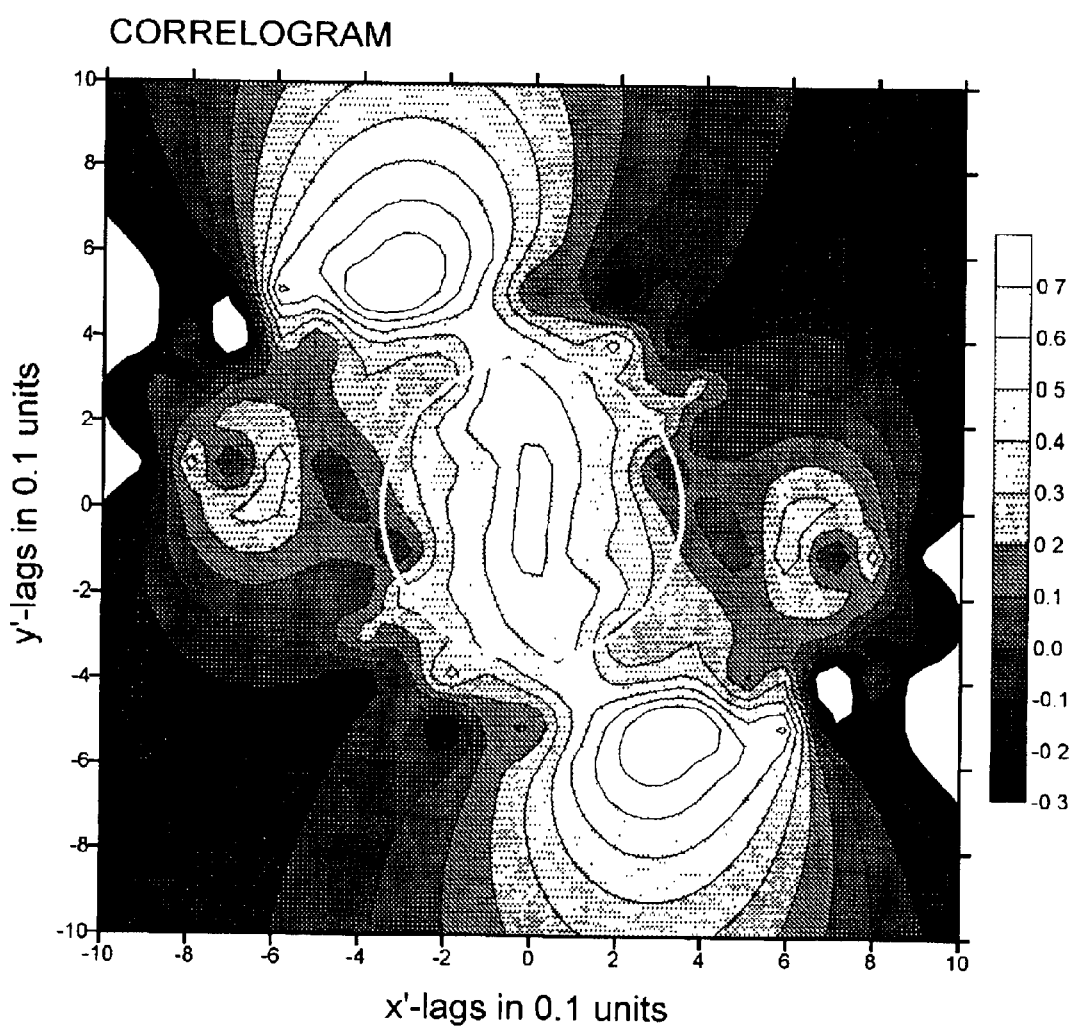
FIG. 11 is a correlogram map computed for the pairs of mean solar radiation flux density indicated in FIG. 10. The light circle with a radius of 0.35 units indicates the range of separations with acceptable numbers of pairs for analysis. The transformed coordinate system represents all separations possible within the range without regard to the number of samples available in the database for this hour-of-the-year at any separation distance.

In a manner parallel to the prior art, the correlogram map for the region is computed (FIG. 11). The are separations with high correlation outside of the 0.35 radius, but examination of FIG. 10 at the same coordinates indicates that the value is computed for as few as 1 sample pair. The correlation for pairs near (0,0) is the highest. This represents pairs that receive approximately the same extraterrestrial radiation and are the same distance from the Pacific Ocean. As separations increase correlation decreases slowly. Note in FIG. 11 indication of anisotrophy, i.e., the correlation is better up and down that it is left to right. This influence can easily be accommodated during estimation but will not be used in this discussion. The slight elliptical shape to the contours indicates the greater important of equal extraterrestrial radiation than distance to the coast.

Figure 12:
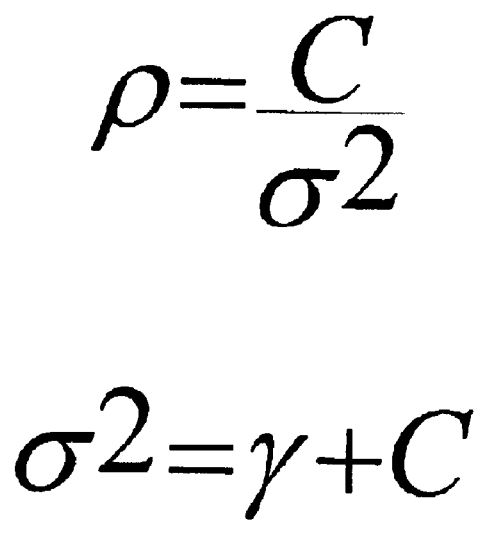

In geostatistics, models of correlation are more conveniently based on another measure of correlation, the semivariogram rather than the correlogram. Four statistical measures representing correlation or lack of, are used in geostatistics: variance ($\sigma^2$), covariance (C), correlogram ($\rho$), and semivariogram ($\gamma$). The relation between the correlogram, covariance, semivariogram, and variance can be expressed in two equations, FIG. 12.

Figure 13:
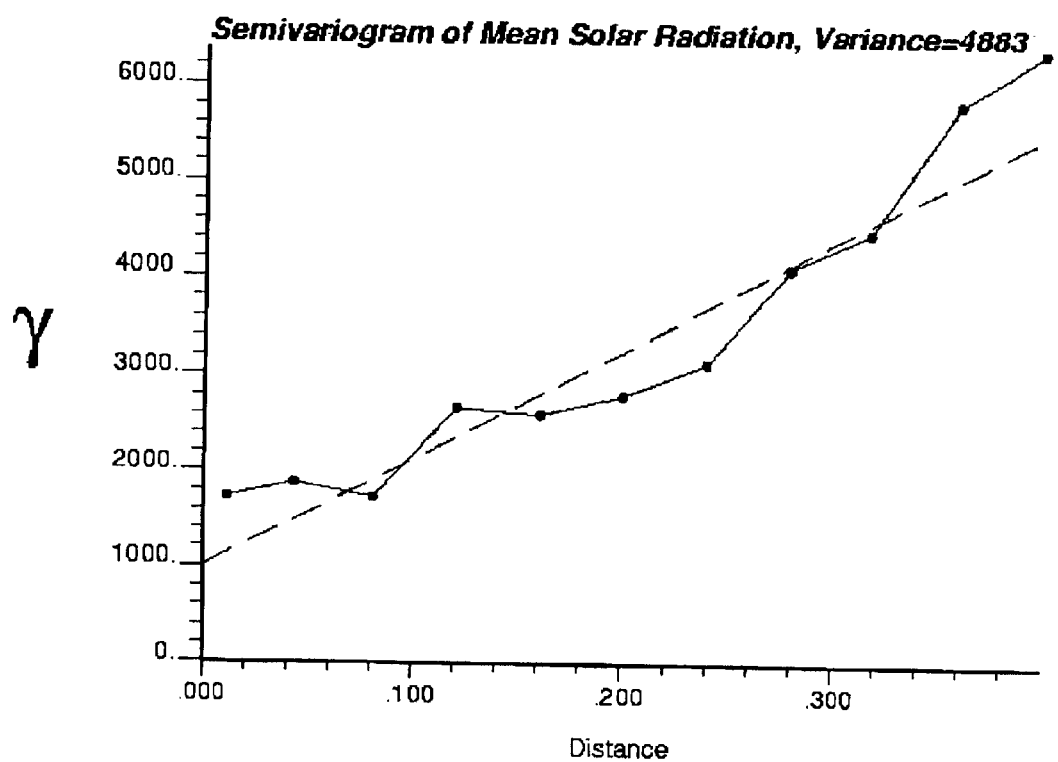
FIG. 13 is a graph of the experimental variogram (solid line) calculated from the mean solar radiation flux density for November 10, from 12pm to 1pm Pacific Standard Time, all years of record, and a linear semivariogram model (dashed line) used for kriging. Separation distance is the fraction of maximum range possible in transformed coordinate system.

From any two of the measures, the other two can be easily derived, and therefore used interchangeably. The calculated omni-directional semivariogram (solid line) as a function of the distance between samples for the same data used in FIG. 11, is shown in FIG. 13. The y-axis in FIG. 13 is in the same units as the variance so it can be noted that at a distance of approximately 0.3 units the semivariogram has reached the value of the variance or 4883. Also shown in FIG. 13 is a model semivariogram (dashed line) is using during estimation procedures (kriging) rather than the calculated semivariogram. This would indicate that correlations between samples separated by less than 0.35 units are better than the variance of all samples. Although more sophisticated modeling techniques could be employed with this method once correlation has been identified, it is demonstrated here with very simple technique. Using the variogram model in FIG. 13, a uniform grid can be constructed for the entire transformed region, and contours of ranges of the variable, mean solar radiation flux density, can calculated as in FIG. 15.

Figure 1:
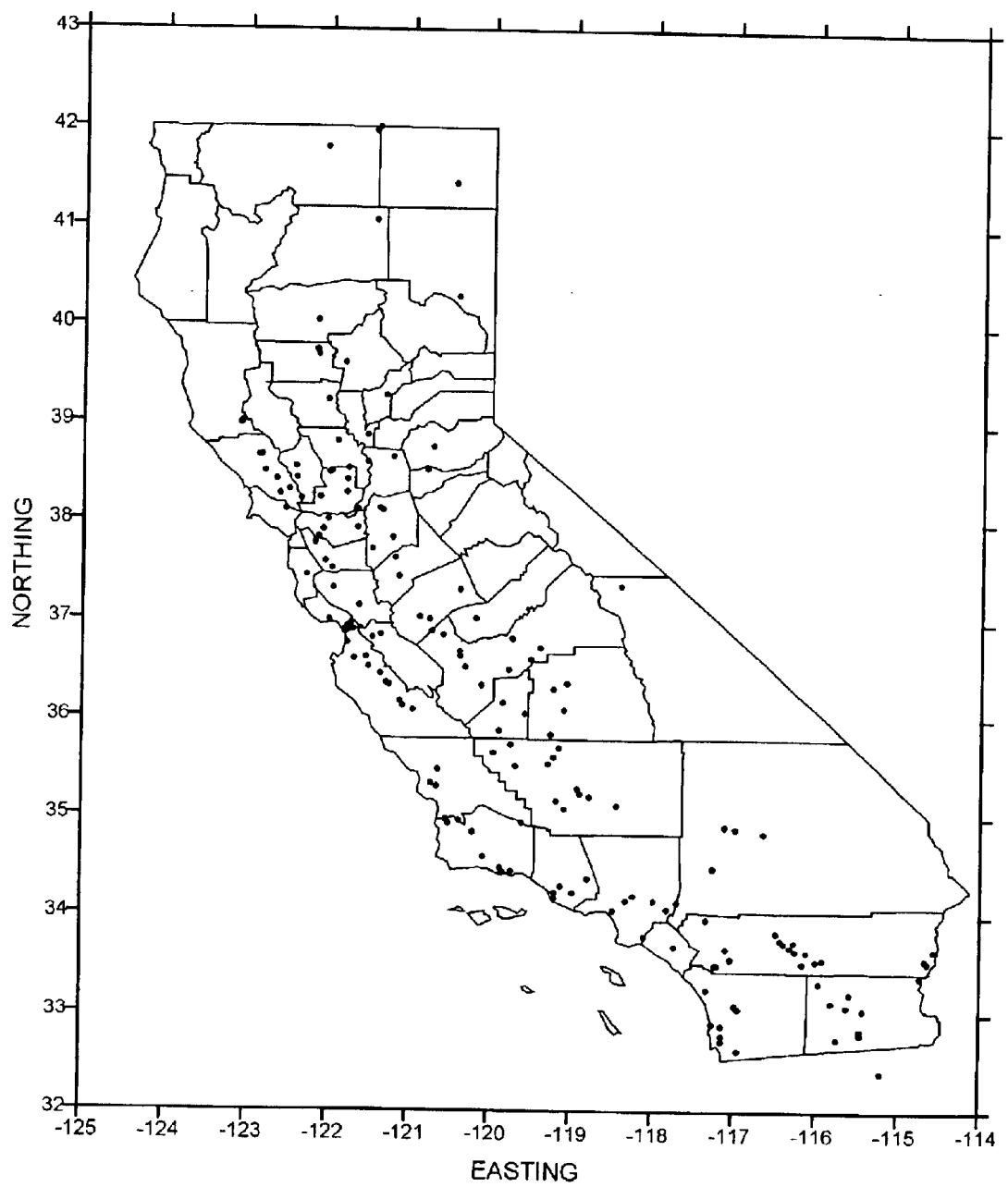
FIG. 1 is a map of the state of California with county boundaries. The coordinate system is degrees of longitude East (EASTING) and degrees of latitude North (NORTHING). The location of every active and inactive CIMIS weather station is indicated by a dark circle. Stations are not uniformly located throughout the region.
Figure 2:
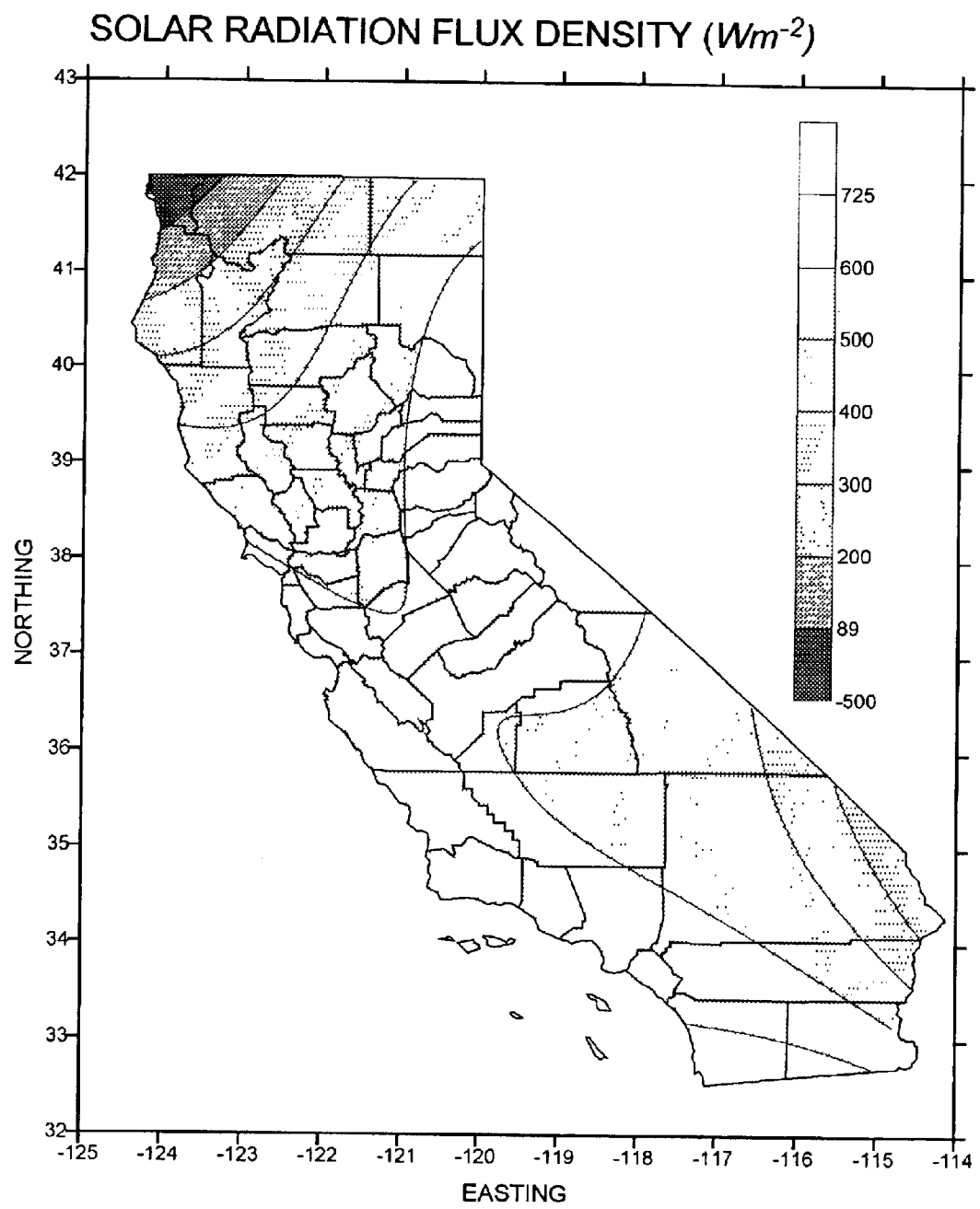
FIG. 2 illustrates contours intervals of solar radiation flux density values in Watts per Square Meter estimated throughout the region for a one-hour period. The prior art technique of linear regression to fit a cubic equation as a function of longitude and latitude was used in this sample for Nov. 10, 1996, from 12pm to 1 pm Pacific Standard Time.
Figure 3:
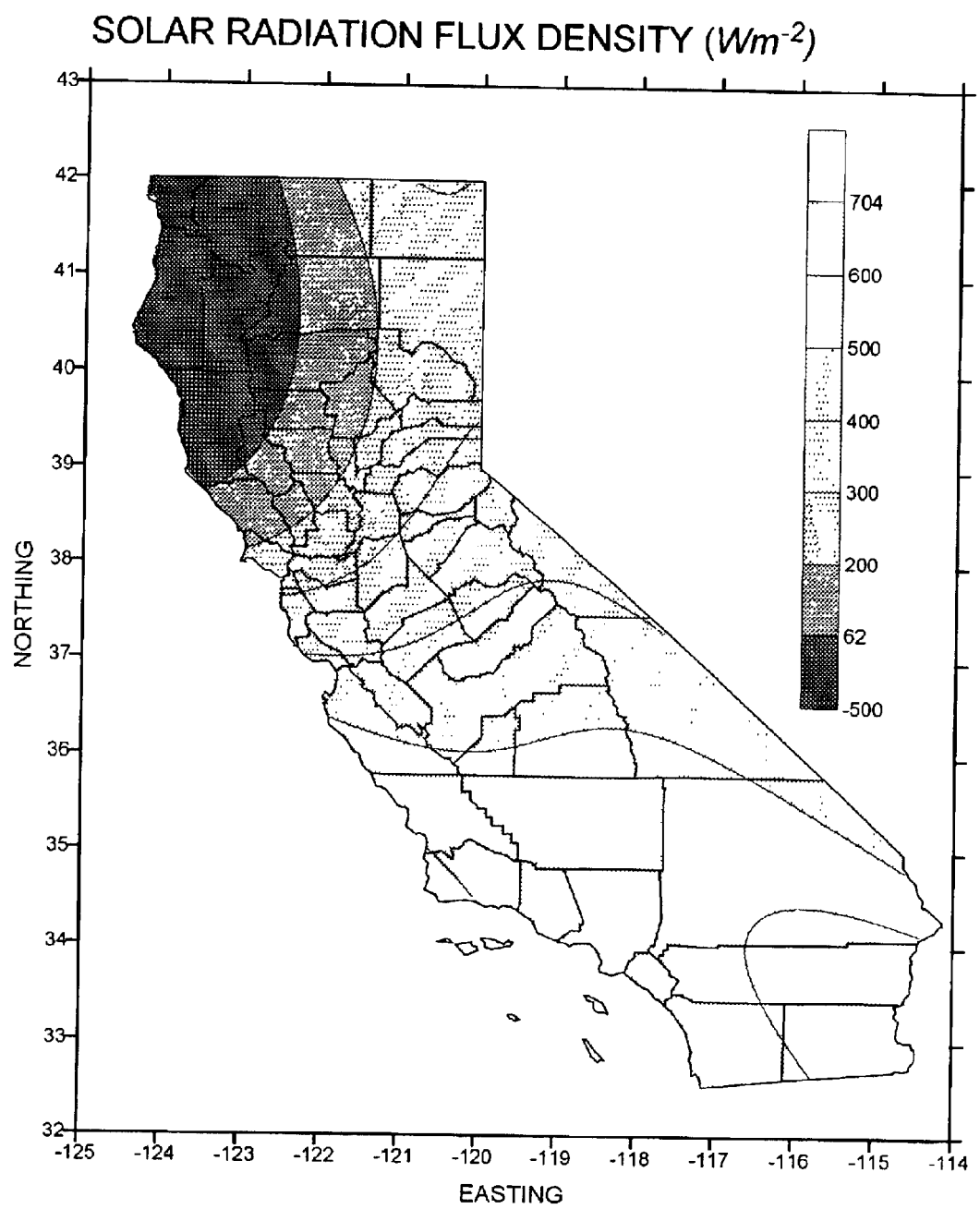
FIG. 3 illustrates contours intervals of mean solar radiation flux density values in Watts per Square Meter estimated throughout the region for one hour-of-the-year. The prior art technique of linear regression to fit a cubic equation as a function of longitude and latitude was applied to the mean values representing all data for November 10, from 12pm to 1pm Pacific Standard Time for all years of record.
Figure 14:
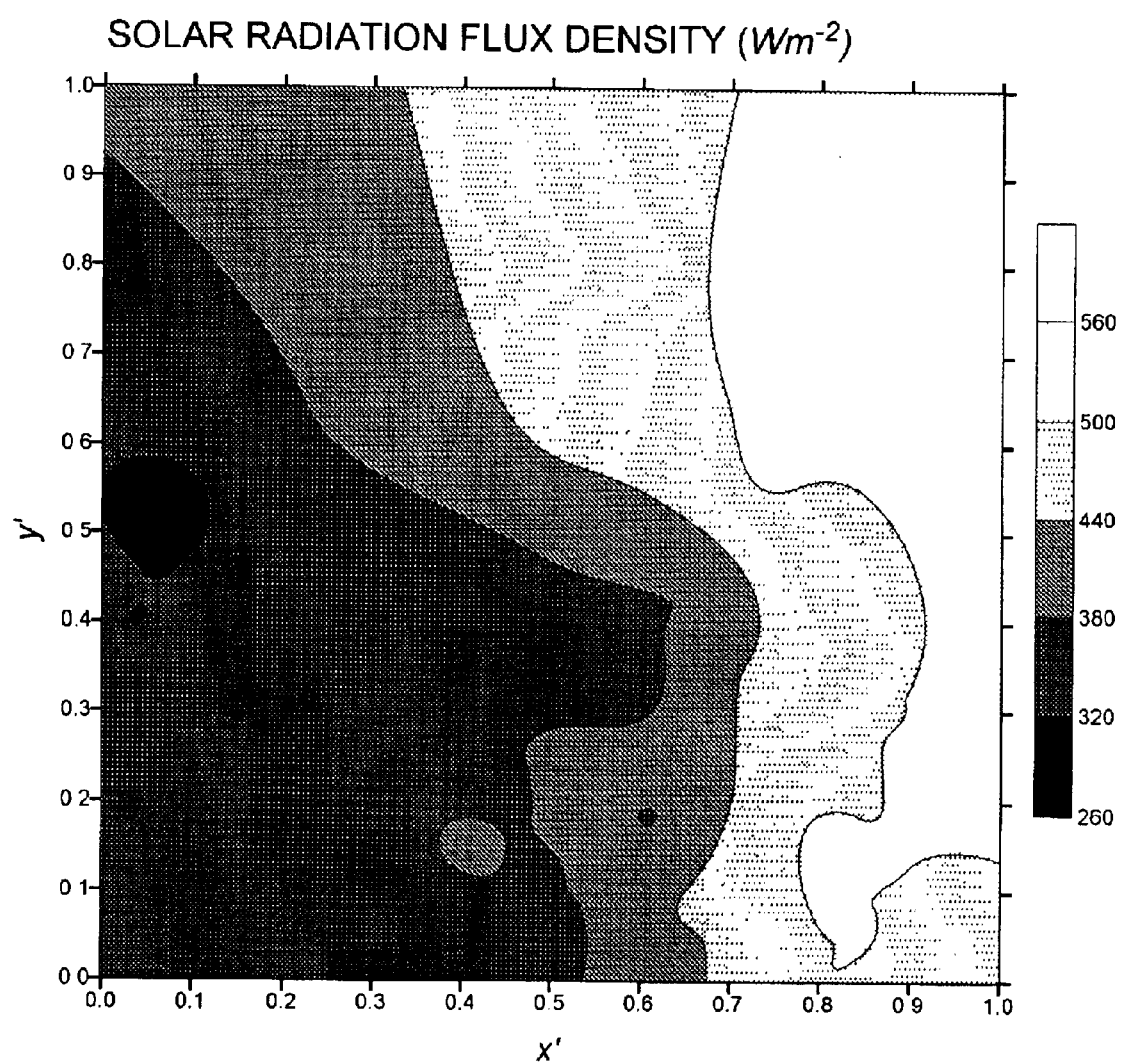
FIG. 14 is a contour plot in the transformed coordinate system of estimated mean solar radiation flux density in Watts per square meter. The contour map was created from a 300×300 point grid estimated using kriging and the variogram model in FIG. 13.
Figure 15:
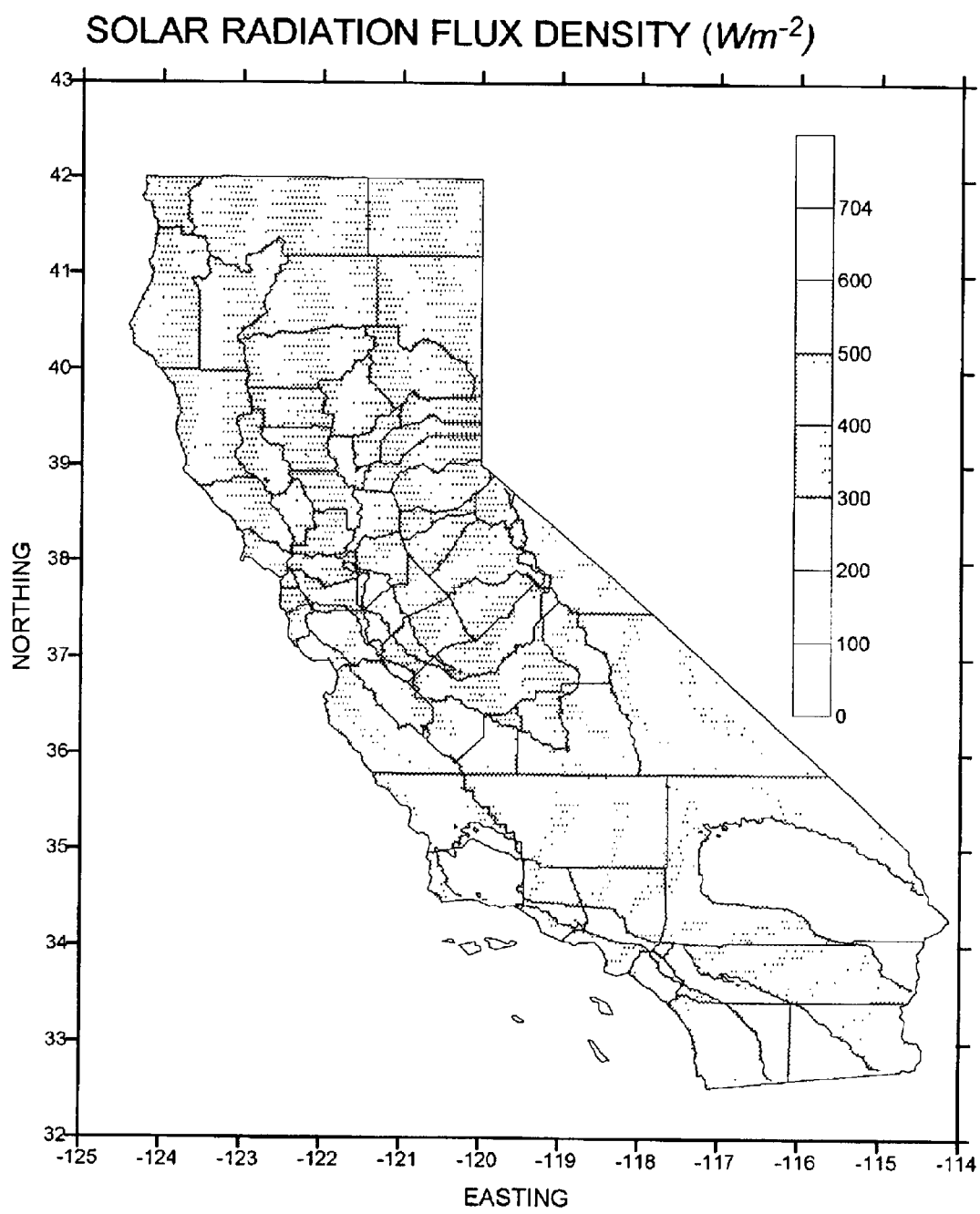
FIG. 15 is FIG. 14 transformed from the alternative coordinate system back to longitude East and latitude North. Portions of the region outside of the state of California have been blanked.

FIG. 14 exhibits a desirable feature for the application of kriging with an omni directional variogram: generally a linear trend from left to right (increasing extraterrestrial radiation) for any distance from the coast as you move up and down. By transforming the contours of FIG. 14 back to latitude and longitude, blanking any area outside the region of California, and then adding California county boundaries, the map of mean solar radiation flux density in FIG. 15 can be created. The average values estimated for all grid points had a range of 303 to 529 Watts per square meter, much more reasonable than the value ranges in FIG. 3. The grid used to create FIG. 15, like FIG. 3, had 300×300 grid lines, representing 90,000 grid intersections. The conversion of FIG. 14 to FIG. 15 is discussed in the following discussion.

A data file with 6 columns of values was created that contained 90,000 rows, one for each grid location. The latitude and longitude of each grid intersection was placed in the first two columns. Columns 3 and 4 contain x' and y' coordinates calculated from columns 1 and 2 plus the day and hour of the time period. The 5th and 6th columns were initialized with zeros. Contouring utility software can evaluate the data file created and at each of the 90,000 locations in (x', y') compute the difference between a variable (zero) at this location and the value at the same grid point used to draw FIG. 14. The difference is placed in the 6th column. The value in the 6th column is used to create a grid using the technique of nearest neighbor to draw FIG. 15 and the coordinates of columns 1 and 2. In photovoltaic applications, mean values would be computed by this method for each daylight hour of the year. In other applications, this mean value is one-half of the input to spatially estimate an individual hour in time and will be discussed in the following section.

I-4. Geostatistical Analysis and Variogram Models for Spatial Estimate of Normalized Departure from the Mean The development of the model for the normalized departure from the mean solar radiation flux density is detailed in this section. As shown in the equation in FIG. 7b, the departure of solar radiation flux density from the mean is computed using the normalized departure from mean clearness, $k'_{norm}$.

Figure 16:
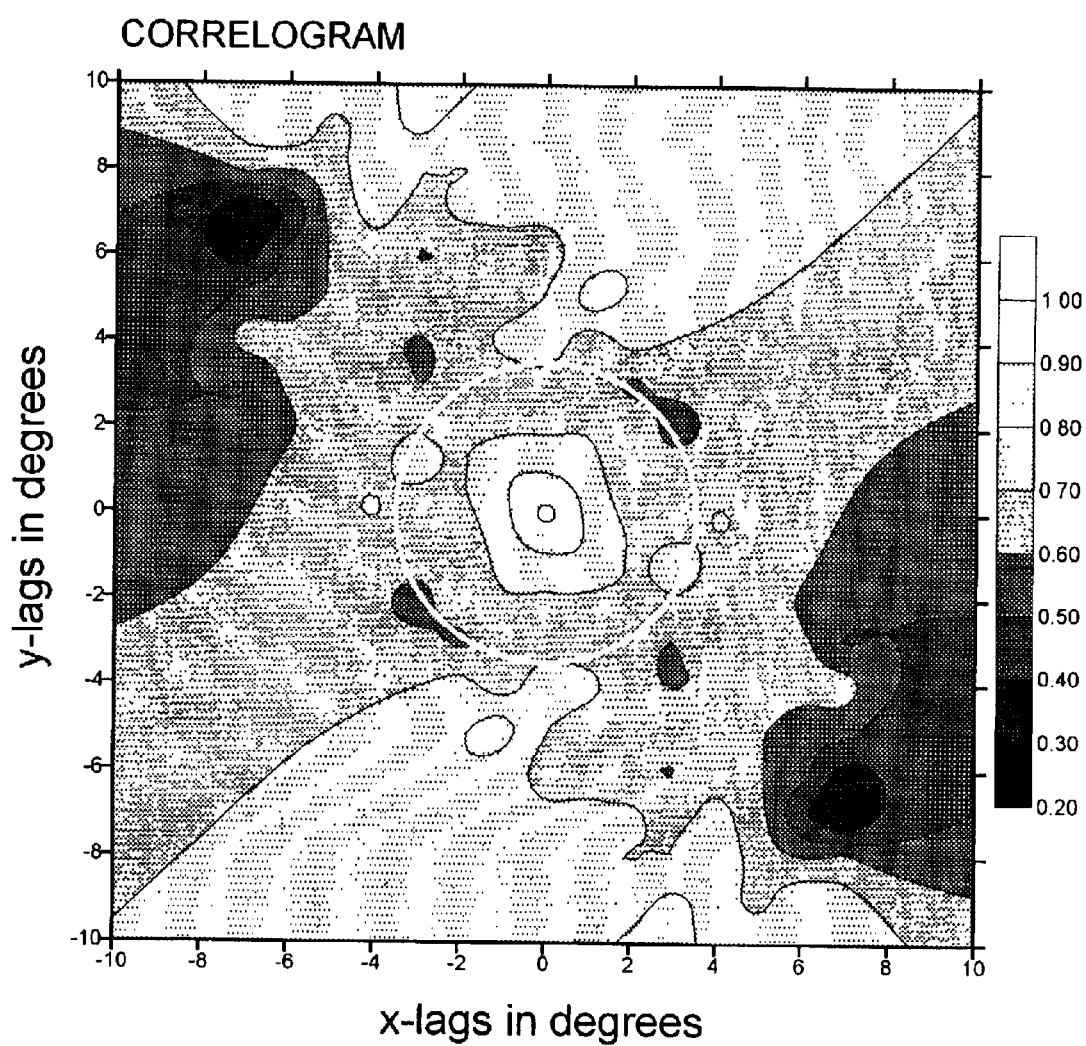
FIG. 16 is a correlogram map computed for the pairs of normalized clearness departure observations for November 10, from 12pm to 1pm Pacific Standard Time. The light circle with a radius of 3.5 degrees indicates the range of separations with acceptable numbers of pairs for analysis. Pairs are formed from all years but only include pairs of observations in the same year.

Therefore in a fashion as was done in the previous analyses, the number of pairs available were determined and a correlogram map of normalized clearness departs was created (FIG. 16). Data from all years of the database were used, but only samples from the same year were included in the count of possible pairs. This will, therefore, be a long-term description of the correlation used for modeling rather than analysis of each individual year.

FIG. 16 does exhibit the desired characteristics to justify simple techniques of geostatistics to estimate $k'_{norm}$: the best correlations are located for small separations (near center of map) and correlations decrease approximately the same in any direction. As noted before, however, we do not have sufficient sample pairs in all directions beyond 3.5 degrees and that limit will be used in estimation by kriging. And in a manner similar to those used to create FIG. 13, FIG. 17 indicates the calculated omni directional semivariogram (solid line) and the chosen variogram model for estimation (dashed line): spherical with a range of 10 (where the semivariogram is equal to the variance for all data). Even though we know there are limited pairs over distances greater that 3.5 degrees, the calculated omni-directional variogram of FIG. 17 does not exceed the variance until a separation distance of 10 degrees where pairs are available.

Figure 17:
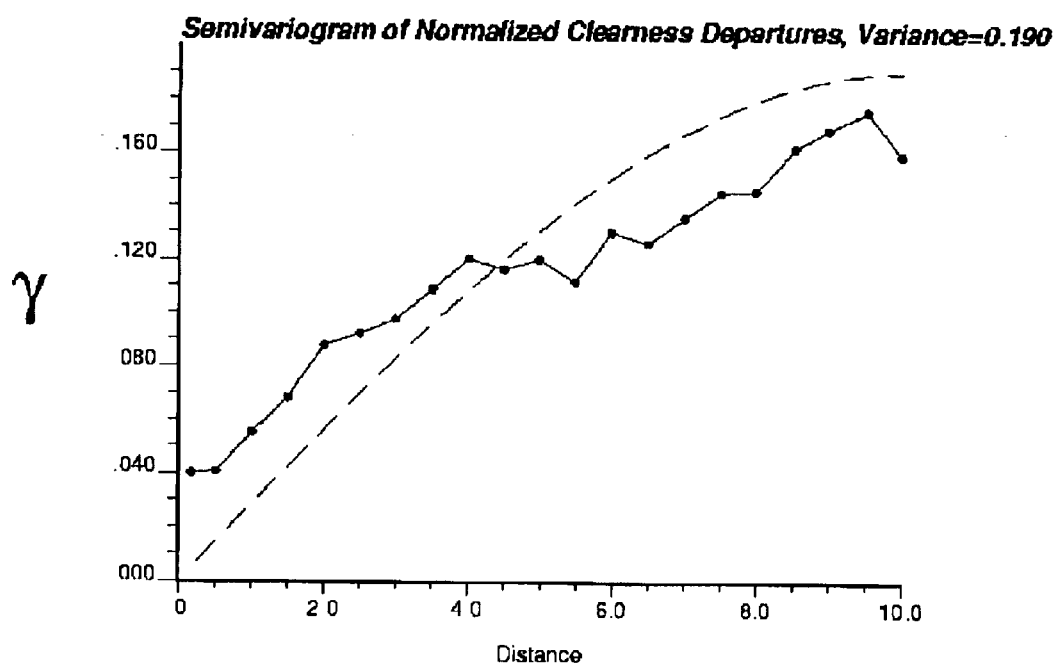
FIG. 17 is a graph of the experimental variogram (solid line) calculated from observed normalized clearness departures for November 10, from 12pm to 1pm Pacific Standard Time, all years of record, and a spherical semivariogram model (dashed line) used for kriging. Separation distance is in degrees.
Figure 18:
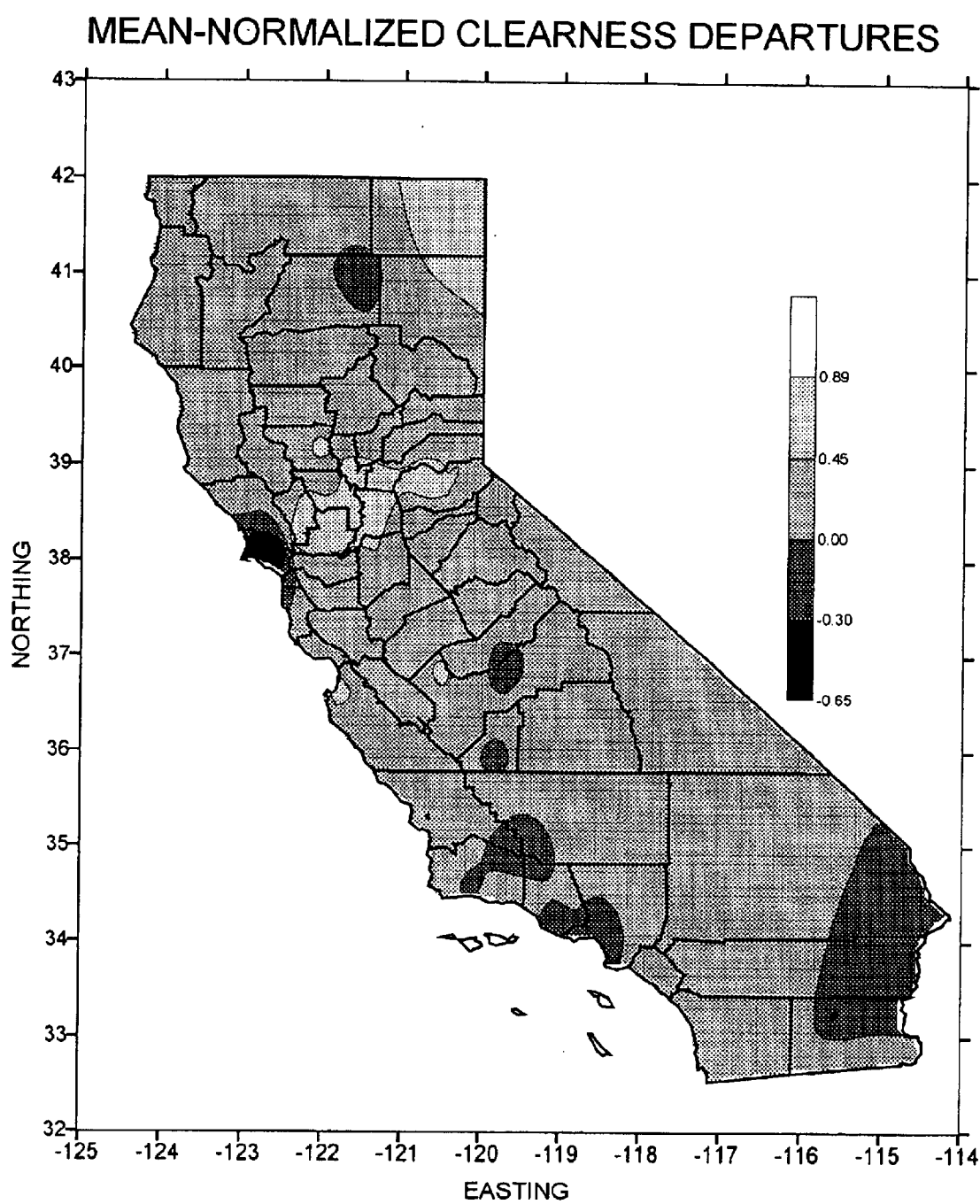
FIG. 18 is a contour map of estimated departures from mean clearness for the period Nov. 10, 1996, from 2pm to 1pm Pacific Standard Time. The contours were created from a 300×300 point grid estimated using kriging and the variogram model from FIG. 17.

Kriging using the variogram model in FIG. 17, with a range limit of 3.5 degrees, creates the map in FIG. 18 for Nov. 10, 1996, from 12pm to 1pm Pacific Standard Time. The variogram model was created from the analysis of all sample pairs of normalized clearness departures for all years, and thus represents the long-term characteristics of correlation and might not be the best for any individual year. Creating a variogram model from the data available in one year would provide inadequate numbers of sample pairs to justify this approach. The values range from −0.66 to 0.89 for November 10 from 12pm to 1pm Pacific Standard Time. A value of 0.89 at a grid location would indicate 89% more sunshine than the average for this hour-of-the year.

Figure 19:
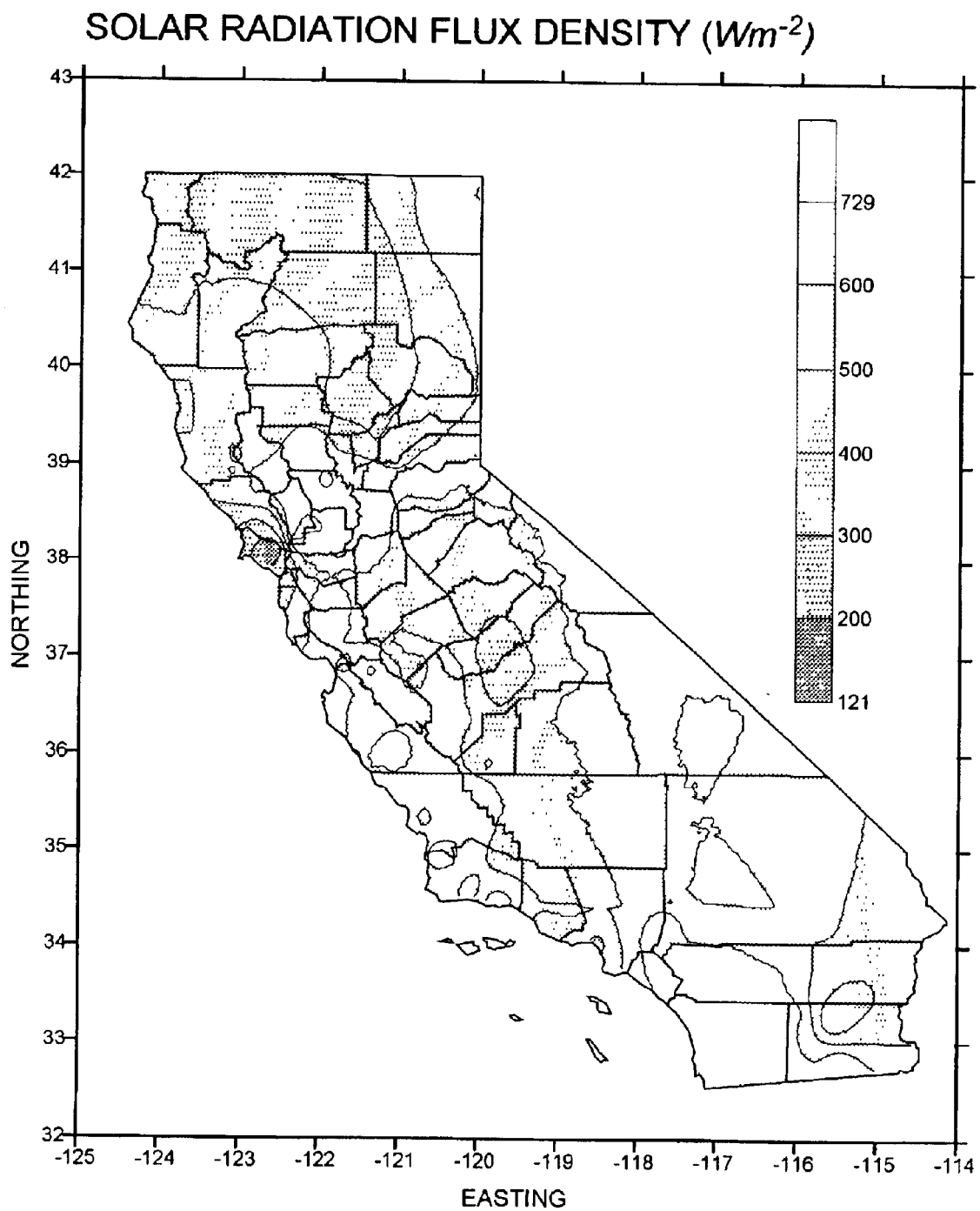
FIG. 19 is a contour map of estimated solar radiation flux density for the period Nov. 10, 1996, 12-13PST using the steps of the method outlined in FIG. 6.

I-5 Combine Models for Spatial Estimate of Mean and Spatial Estimate of Departure from Mean The grids constructed in the preparation of FIGS. 15 and 18 are combined according the formula in FIG. 7a. At each of the 90,000 grid intersection points, the corresponding grid location in the grid of normalized clearness departures, the value would be added to 1, and then multiplied by the mean value of solar radiation flux density at the corresponding grid location in the grid used to construct FIG. 15. The contour map created from this combination is drawn in FIG. 19. The range of values at grid locations was from 121 to 727 Watts per square meter.

II-Application of the Method to Other Solar-Correlated Variables

As demonstrated for solar radiation flux density, the method can be applied to other meteorological variables whose mean value field can be transformed to improve correlation and whose departures from the mean are correlated with clearness departures from the mean solar radiation flux density. Table 1 indicates favorable correlations between the solar radiation flux density or clearness index with $ET_0$ (reference evapotranspiration), $T_a$ (air temperature), and vpd (vapor pressure deficit, selected moisture variable).

| X | Y | Slope | Intercept | Correlation | Pairs |
|---|---|---|---|---|---|
| $R_s$ | $ET_0$ | 0.001 | −0.039 | 0.933 | 1172 |
| $k_t$ | $ET_0$ | 0.595 | −0.039 | 0.916 | 1172 |
| $R_s$ | $T_8$ | 0.018 | 10.660 | 0.623 | 1210 |
| $k_t$ | $T_8$ | 13.532 | 11.059 | 0.581 | 1210 |
| $R_s$ | vpd | 0.003 | −0.090 | 0.642 | 1161 |
| $k_t$ | vpd | 2.278 | −0.046 | 0.610 | 1161 |

The good correlation between reference evapotranspiration and solar radiation flux density can be expected due to the correlations of air temperature and vapor pressure deficient with solar radiation flux density and the fact that air temperature and vapor pressure deficient are secondary variable in the computation of reference evapotranspiration.

I claim:

1. A multivariable statistical method for use when making decisions relating to irrigation management, photovoltaic application engineering, passive space conditioning or other activities, for estimating solar correlated variables for a geographical location identified by latitude and longitude within a geographical region including a synchronous network of a plurality of weather stations incorporating instruments necessary to acquire or calculate the variables and a database of historical meteorological values of the variables for specific time periods over a number of years, said method comprising the steps of:

selecting from the database of said plurality of weather stations a dataset including data for the variables for a time period identified by day of year, time of mid-period, and period length for the same specific time period of every calendar year for a number of years;

calculating for every occurrence of measured solar radiation in the dataset the clearness index and the extraterrestrial radiation as a function of latitude, longitude, time zone, day of year, time of mid-period, and period length;

calculating for every weather station in the dataset identified by latitude and longitude a primary coordinate in an alternative coordinate system whose value is the relative extraterrestrial radiation for the time period as a fraction of the maximum extraterrestrial radiation at any location within the geographical region for the time period;

calculating for every weather station in the dataset identified by latitude and longitude one or more coordinates in an alternative coordinate system whose value is a relative distance from the weather station to a boundary specific to the geographical region as a fraction of the maximum distance from any location within the geographical region to the boundary;

calculating the mean value for each variable for each weather station identified by latitude and longitude in the dataset;

calculating the departure from the mean for every recorded variable value for each weather station identified by latitude and longitude in the dataset;

calculating the normalized departure from the mean by dividing every departure by the mean by the weather station mean value for the same recorded variable;

analyzing spatial correlations and developing variogram models for the mean variables in the alternative coordinate system;

analyzing spatial correlations and developing variogram models for normalized departure variables in latitude and longitude;

creating a data file containing the latitude, longitude, and equivalent coordinates in the alternative coordinate system that defines grid intersections on a uniform mathematical grid over the region with selected resolution;

for a preselected variable, estimating the mean for every grid intersection identified by the equivalent coordinates in the alternative coordinate system contained in the data file by kriging or other appropriate geostatistical modeling method utilizing the variogram models developed;

for said preselected variable, estimating the normalized clearness departure for every grid intersection identified by latitude and longitude contained in the data file by kriging or other appropriate geostatistical modeling method utilizing the variogram models developed;

fitting a linear model defined by slope and intercept to the relationship between all calculated normalized departures for the preselected variable and all normalized clearness departures for every station in the dataset;

calculating the estimate of the normalized variable departure at every grid intersection defined in the data file utilizing the linear model applied to the normalized clearness departure for the same grid intersection; and at every grid intersection summing the estimate for the mean and the estimate for the departure from the mean for the preselected variable to obtain the variable estimate at each grid intersection.

2. The method according to claim 1 including the additional step of drawing contours on a map of the geographical region indicating values of the preselected variable over the region.

3. The method according to claim 1 including the additional step of estimating the preselected variable at any location within the geographic region.

4. The method according to claim 1 wherein said preselected variable is solar radiation flux density.

5. The method according to claim 1 wherein said solar correlated variable is air temperature.

6. The method according to claim 1 wherein said solar correlated variable is water vapor pressure.

7. The method according to claim 1 wherein said solar correlated variable is reference evapotranspiration.

8. The method according to claim 1 wherein the database of historical meteorological values comprises historical hourly average values.

9. The method according to claim 1 wherein said plurality of weather stations are located substantially at ground level.

10. The method according to claim 1 wherein said plurality of weather stations are located substantially above ground level.

* * * * *